(12) United States Patent
Baskakov et al.

(10) Patent No.: US 9,152,573 B2
(45) Date of Patent: Oct. 6, 2015

(54) SHARING MEMORY PAGES HAVING REGULAR EXPRESSIONS WITHIN A VIRTUAL MACHINE

(75) Inventors: Yury Baskakov, Newton, MA (US); Alexander Thomas Garthwaite, Beverly, MA (US)

(73) Assignee: VMware, Inc., Palo Alto, CA (US)

( * ) Notice: Subject to any disclaimer, the term of this patent is extended or adjusted under 35 U.S.C. 154(b) by 984 days.

(21) Appl. No.: 13/298,214

(22) Filed: Nov. 16, 2011

(65) Prior Publication Data

US 2012/0131259 A1   May 24, 2012

Related U.S. Application Data

(60) Provisional application No. 61/414,315, filed on Nov. 16, 2010.

(51) Int. Cl.
*G06F 9/455* (2006.01)
*G06F 12/10* (2006.01)

(52) U.S. Cl.
CPC .......... *G06F 12/109* (2013.01); *G06F 9/45558* (2013.01); *G06F 2009/45583* (2013.01); *G06F 2212/151* (2013.01); *G06F 2212/656* (2013.01)

(58) Field of Classification Search
None
See application file for complete search history.

(56) References Cited

U.S. PATENT DOCUMENTS

| 7,500,048 B1 * | 3/2009 | Venkitachalam et al. ........ 711/6 |
| 2008/0228990 A1 * | 9/2008 | Tomonaga .................... 711/100 |
| 2008/0263258 A1 * | 10/2008 | Allwell et al. .................... 711/6 |
| 2010/0031271 A1 * | 2/2010 | Corry et al. .................... 719/312 |
| 2010/0082896 A1 * | 4/2010 | Orikasa et al. ................. 711/111 |
| 2010/0223432 A1 * | 9/2010 | Eidus et al. .................... 711/148 |
| 2012/0089764 A1 * | 4/2012 | Baskakov et al. ................. 711/6 |

OTHER PUBLICATIONS

Gupta et al. "Difference Engine: Harnessing Memory Redundancy in Virtual Machines." Dec. 2008. USENIX. OSDI '08. pp. 309-322.*
Schwartz et al. Learning Perl. Jul. 2005. O'Reilly Media. 4$^{th}$ ed. pp. 103-109.*
Michael Palmer. "Multi-Regex: Single pass replace of multiple regexes (Python recipe)." Apr. 2009. http://code.activestate.com/recipes/576710-multi-regex-single-pass-replace-of-multiple-regexe/.*
Wei et al. "Managing Security of Virtual Machine Images in a Cloud Environment." Nov. 2009. ACM. CCSW '09. pp. 91-96.*

* cited by examiner

*Primary Examiner* — Nathan Sadler

(57) ABSTRACT

A lightweight technique for sharing memory pages within a virtual machine (VM) is provided. This technique can be used on its own to implement intra-VM page sharing or it can be augmented with sharing across VMs. Memory pages whose content can be described by some succinct grammar, such as a regular expression or simple pattern, are identified for sharing within a VM. If the content of a page matches some simple pattern, it is proposed to share such a page, but only in the scope of the VM to which it belongs, i.e., intra-VM sharing. All other pages, i.e., those that are not simple patterns, can be candidates for sharing in the scope of all currently active VMs, i.e., inter-VM sharing. Either fully functional page sharing across VMs and/or page sharing in the context of each VM can be implemented.

41 Claims, 7 Drawing Sheets

SHARING MEMORY PAGES HAVING REGULAR EXPRESSIONS WITHIN A VIRTUAL MACHINE

CROSS-REFERENCE TO RELATED APPLICATIONS

This application claims the benefit of U.S. Provisional Application No. 61/414,315 filed on Nov. 16, 2010.

BACKGROUND

A virtual machine (VM) is an abstraction, i.e., a "virtualization," of a physical computer system and provides an environment in which an operating system may execute with apparent control of a dedicated physical machine. Multiple virtual machines may execute on a common hardware machine and each virtual machine may operate with protection and isolation from other virtual machines executing on the same common hardware machine. Each virtual machine typically encapsulates a complete executing state for a corresponding operating system, including both user-level applications and kernel-mode operating system services.

In many computing environments, each hardware machine is typically underutilized when executing a corresponding server application. As a result of hardware underutilization averaged over many hardware machines, computing environments configured to dedicate a hardware machine to each server application are typically characterized as being very inefficient with respect to cost, power consumption, management, and, potentially, reliability.

Virtual machines are advantageously deployed to consolidate multiple software servers in a computing environment onto one or more shared hardware machines for execution. A hypervisor is a software layer that virtualizes hardware resources and presents a virtual hardware interface to one or more virtual machine instances that may reflect an underlying hardware machine architecture or an abstraction of an arbitrary machine architecture. The hypervisor may perform certain management functions with respect to an executing virtual machine.

Each virtual machine executing on a hardware machine includes a memory image of apparent physical memory. Because virtual machines tend to have working sets that are smaller than memory configured for the virtual machine, hardware machine memory may be efficiently overcommitted for many applications. For example, a hardware machine with four gigabytes of total machine memory may host a set of virtual machines that has a total of sixteen gigabytes of apparent configured physical memory. While approximately four gigabytes of machine memory are actually available at any one time, this four gigabytes of machine memory can be used by the virtual machines in the set in a multiplexed manner by demand-paging to a file residing in an attached mass storage system. The mass storage system conventionally comprises one or more magnetic hard disk drives, however, any form of mass storage system may be used. For example, in modern computer systems the mass storage system may comprise a solid-state drive (SSD) or an array of SSDs. Page sharing and ballooning, among various techniques, may be employed to reduce demand paging and enhance overall efficiency.

Page sharing is a memory reclamation technique widely used in virtual execution environments. This technique saves memory by eliminating duplicate pages—once such duplicates are identified for a given page's content, corresponding guest pages are mapped to the same shared machine page copy-on-write (COW) and old backing pages are released to the platform.

Ideally, duplicate contents should be identified and a corresponding page should be shared right at the moment a page's content is created, or is about to be created, in guest's memory. One known implementation of such a principle, for example, is when guest code responsible for creation of zero pages is identified by the hypervisor and its execution is skipped. The hypervisor then backs the guest physical memory page with the shared page of that content. Another known example is when an I/O operation reads page contents from a disk block that was already read to a different page. If this situation can be recognized then this read operation, and all subsequent reads from the same disk block, should be skipped and destination guest physical memory pages should be immediately backed with a shared machine memory page. These and other similar methods, however, cannot detect all sharing opportunities so that periodic searches for duplicates, known as transparent page sharing, typically takes place and covers both code and data pages' domains.

Memory content evolves over time and, therefore, so do sharing opportunities. An exhaustive periodic search for duplicates is not an option due to time constraints and, therefore, the scope of any search for duplicates is typically limited to a subset of memory pages. This subset might be obtained, for example, through random page sampling or sequential page scanning. Other selection criteria driven by page locality information, I/O, or execution activity, may also be applied. Another optimization approach typically used to speedup matching of identical pages applies a hash function to a page's content so that the hash values, and not the content, are compared most of the time.

In one known memory sharing approach, for each memory page to be examined, the following steps are typically taken. First, a hash of the page's contents is computed. Then, the result of hashing is looked up in a table that tracks all currently shared pages. If a page with an identical hash is found, a byte-by-byte comparison of the two pages' contents is performed, to assure that the contents do match, so that sharing can be initiated. If no match among already shared pages was found, the previously examined pages (hints) tracked by the same or a different hash table are tried next. As before, a table lookup is followed by a byte-by-byte comparison if a page with an identical hash was found.

Of these, the most expensive operations are hash computation and content comparison, although hash table lookup does not come for free and can produce noticeable overhead if any of the hash tables is improperly balanced.

Hash tables are typically maintained in a context visible to all VMs on the host. When virtualization software controls all the resources of the host itself, i.e., a "bare-metal model," the shared context is provided by the kernel. When virtualization software is running on a commodity operating system, i.e., a "hosted model," such a shared context is implemented in a special kernel module (a vmmon driver in products of VMware, Inc.) loaded in to the host OS and candidates for sharing are supplied there by a user level process. Being in a shared context, therefore, hash tables are typically protected by one or more global locks.

Global lock contentions and context switches, for example, from the user level process to the driver, add additional overhead to page sharing. Further, as the amount of time dedicated to a page sharing service is limited, a maximum rate at which pages may be examined is dictated by the per-page processing overhead. Thus, it is desirable to keep the cost of each operation as low as possible.

What is needed, therefore, is a mechanism for efficiently sharing memory pages in a virtualized system.

SUMMARY

Embodiments of the present invention provide a lightweight technique for identifying guest pages that are most likely shareable within a virtual machine (VM). This technique can be used on its own to implement intra-VM page sharing or it can be augmented with sharing across VMs. In either case, the method makes page sharing as a service faster and less resource consuming than known approaches.

One or more embodiments provide for first classifying of the memory pages. If the contents of a page matches some simple pattern, it is proposed to share such a page, but only in the scope of the VM to which it belongs, i.e., intra-VM sharing. All other pages, i.e., those that are not simple patterns, can be candidates for sharing in the scope of all currently active VMs, i.e., inter-VM sharing. As a result, it is now possible to choose between fully functional page sharing across VMs and lightweight local page sharing in the context of a single VM. Advantageously, this approach supports page sharing, and its advantages, in those systems where maintaining a common shared context across VMs is not possible or not desirable for any number of reasons.

BRIEF DESCRIPTION OF THE DRAWINGS

Various aspects of at least one embodiment of the present invention are discussed below with reference to the accompanying figures. In the figures, which are not intended to be drawn to scale, each identical, or nearly identical, component that is illustrated is represented by a like numeral. For purposes of clarity, however, not every component may be labeled in every drawing. The figures are provided for the purposes of illustration and explanation and are not intended as a definition of the limits of the invention.

In the figures.

DETAILED DESCRIPTION

Figure 1:
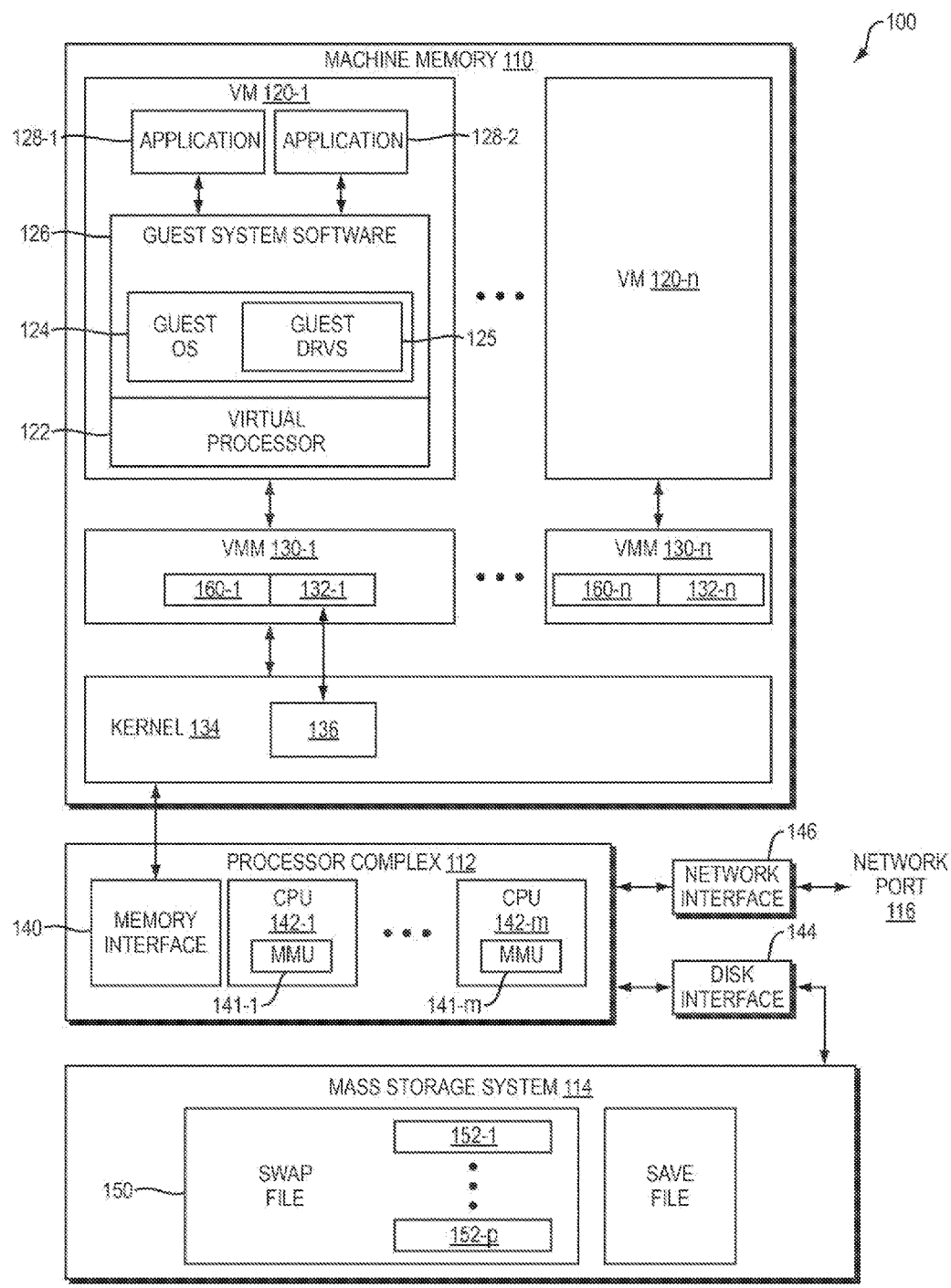
FIG. 1 is a block diagram illustrating a computer system configured to implement one or more aspects of the present invention.

Embodiments of the present invention provide a lightweight technique for sharing memory pages within a VM. This technique can be used on its own to implement intra-VM page sharing or it can be augmented with sharing across VMs. In either case, embodiments of the present invention provide for page sharing as a service that is faster and less resource consuming by providing a method for identifying guest pages that are most likely shareable within a VM.

It has been observed that, for memory pages with certain contents, one does not have to look for duplicates to know that there are memory pages that should be shared. For example, there are plenty of pages full of zeros in system memory. Thus, if it is known the page is full of zeros it can be shared right away. The same observation applies to pages whose contents can be described by some succinct grammar such as a regular expression. Operating systems and applications tend to create pages of certain contents to keep magic numbers or other signatures, e.g., all 0s, all Fs, all Cs, (3F)*, etc. The number of such unique contents is typically small while the number of pages having the particular contents might be significant. Such pages will be referred to herein as pages with simple patterns or pages with regular expressions.

One example of a page with a regular expression or pattern is the WORDS page found in the Windows Operating System from Microsoft, Inc. These pages are identifiable because all words are zero, except for the fifth 32-bit word in 32-bit Windows and the fifth 64-bit word in 64-bit Windows. As has been observed, these pages are persistent and created shortly after a Windows OS has been booted as, for example, a guest operating system in a virtualized system.

In one embodiment, as will be described in more detail below, a classifying of the pages is first performed. If the contents of a page matches some simple pattern, it is proposed to share such a page, but only in the scope of the VM to which it belongs, i.e., intra-VM sharing. All other pages, i.e., those that are not simple patterns, can be candidates for sharing in the scope of all currently active VMs, i.e., inter-VM sharing. As a result, it is now possible to choose between fully functional page sharing across VMs and lightweight local page sharing in the context of a single VM. Advantageously, this approach supports page sharing, and its advantages, in those systems where maintaining a common shared context across VMs is not possible or not desirable for any number of reasons.

With the split of page sharing service into intra-VM and inter-VM phases, sharing state for pages with simple patterns becomes local to VMs and free from inter-VM contentions. Also per-VM tables that track shared pages with patterns are orders of magnitude smaller than hash tables maintained in a shared context so that lookups are much faster. It should be noted that zero pages form a special class, even for sharing within a VM, as they are easily identifiable and always numerous.

The justification for sharing pages with simple patterns locally is that most highly shareable pages within a VM are pages with simple patterns and the benefit of further sharing such pages across VMs is negligible.

As known, in the hosted model of virtualization, shared context is typically maintained by a special driver while local intra-VM context is available in a user level process. In one embodiment of the present invention, pages with patterns will be shared at the user level and no trip to the driver is needed. Other candidate pages will be passed to the driver in order to exploit inter-VM sharing opportunities. In a bare-metal model of virtualization, the intra-VM context can be maintained either by the kernel or by the monitor.

Advantageously, embodiments of the present invention reduce and/or eliminate global lock contentions, improve the efficiency of hash table lookups and reduce and/or eliminate context switches. Further, these characteristics allow for faster sharing as well as the faster termination of sharing.

FIG. 1 is a block diagram illustrating a computer system 100 configured to implement one or more embodiments of the present invention. The computer system 100 includes a processor complex 112, a machine memory 110 and a mass storage system 114. The processor complex 112 may be coupled to the machine memory 110 via any technically feasible electrical interface, such as a dynamic random access memory (DRAM) interface. In other configurations, the processor complex 112 may be coupled to the machine memory 110 via a general transport (bridging) interface, such as industry standard HyperTransport™, PCI-Express™ (or any other technically feasible transport interface). The processor complex 112 may be coupled to the mass storage system 114 via a native storage interface, such as serial advanced technology attachment (SATA), serial attached small computer system interface (SAS), or any other technically feasible native storage interface. In other configurations, the processor complex 112 is coupled to the mass storage system 114 via a network enabled storage interface such as Fibre Channel, internet small computer system interface (iSCSI) or any other technically feasible network enabled storage interface.

The processor complex 112 includes, without limitation, a memory interface 140 and one or more central processing units (CPU) 142-1 through 142-$m$. The memory interface 140 is configured to couple the machine memory 110 to the one or more CPUs 142. Each of the one or more CPUs 142 is configured to execute program instructions stored within the machine memory 110. The program instructions are organized as software modules that may be stored for execution within the machine memory 110. Each of the one or more CPUs 142 includes a memory management unit (MMU) 141 configured to perform, without limitation, translation of addresses, such as virtual addresses, to machine addresses. A disk interface 144 and a network interface 146 are coupled to the processor complex 112. The disk interface 144 is configured to couple the mass storage system 114 to the one or more CPUs 142. The disk interface 144 may include implementation-specific functionality related to controlling disk systems. Such functionality may include, for example, control for redundant array of independent disks (RAID) and caching. The mass storage system 114 may comprise any technically feasible storage elements, such as magnetic disk drives, solid state drives, or any other elements configured to read and write data for persistent storage. The network interface 146 is configured to couple the network port 116 to the one or more CPUs 142 within the processor complex 112. The network interface may include any functionality required to transmit and receive data packets via the network port 116. In one configuration, the network port 116 is an industry standard Ethernet port.

In one embodiment, an executing memory image within machine memory 110 includes a kernel 134, at least one Virtual Machine Monitor (VMM) 130, and at least one virtual machine (VM) 120. Each of the at least one VM 120 is associated on a one-to-one basis with one of the at least one VMM 130.

As shown, the VM 120-1 includes a virtual processor 122, guest system software 126 and one or more applications 128. The applications 128 may launch and execute according to a conventional run time model for a conventional user-space or kernel-space application for the guest system software 126. The guest system software 126 includes a guest operating system (OS) 124, such as a commodity operating system. The guest OS 124 is conventionally configured to provide process control, memory management, and other services required by the application 128. The guest OS 124 includes guest drivers (DRVS) 125 configured to manage corresponding virtual devices (not shown) accessible to the virtual processor 122. The virtual devices are implemented in software to emulate corresponding system hardware components of an actual hardware processor system. The virtual devices may include, without limitation, a network interface, a mass storage interface, peripheral devices, and system memory. During normal execution, an application 128 generates load and store requests targeting a virtual address space, organized as guest virtual page numbers (GVPNs). A request to a GVPN within the guest virtual address space may be mapped to a corresponding guest physical address and guest physical page number (GPPN) by the emulated MMU function within the virtual processor 122. Guest physical memory is organized as distinct units, called pages, each with a corresponding, unique GPPN.

Each of the at least one VM 120 may have a substantially identical internal structure to VM 120-1. Each of the at least one VM 120 may also have an independent physical address space, and therefore a given GPPN within one VM 120 is independent of the same GPPN within a different one of the at least one VM 120.

Each GPPN references a page of guest physical memory, stored in either the machine memory 110 or the mass storage system 114. Therefore, a GPPN may map to a machine page number (MPN) residing within the machine memory 110 or a GPPN may map to a page stored on the mass storage system 114. More than one GPPN may map to a common MPN when the more than one GPPN is in a shared configuration.

In general, a VMM provides an interface between a VM and a host runtime environment. The host runtime environment may be a conventional operating system or a kernel configured to manage hardware elements and overall operation of the computer system 100 and thereby provide system services to the VMM. Alternatively, the host runtime environment may be any technically feasible software module configured to manage the computer system 100 and thereby provide system services to the VMM. The VMM provides access to hardware devices and system services to enable the VM to emulate an apparent hardware system via the virtual processor 122.

In one embodiment, the VMM 130-1 is configured to provide a software interface between the VM 120-1 and the kernel 134. In other embodiments, the VMM 130-1 may be configured to provide an interface between the VM 120-1 and a host operating system (not shown). The VMM 130-1 includes a GPPN to MPN map 132-1, used to translate guest physical addresses generated by VM 120-1 into corresponding machine addresses that may be used to access data stored in the machine memory 110. Each VMM 130-1 through 130-$n$ includes a respective GPPN to MPN map 132. In one embodiment, GPPN to MPN maps 132-1 through 132-$n$ are managed by the kernel 134.

The kernel 134 is configured to manage certain hardware and software resources within the processor complex 112. In particular, the kernel 134 schedules and manages processes VM 120-1 through 120-$n$, and VMM 130-1 through VMM 130-$n$, executing on the one or more CPUs 142. The kernel 134 includes at least one memory management table 136, configured to maintain each GPPN to MPN mapping for accessing machine memory 110. The memory management table 136 includes mappings for each GPPN to MPN map 132-1 through 132-$n$. In this way, the kernel has a global view of all guest physical address to machine address mappings.

The total storage configured for all guest physical address spaces for VMM 130-1 through VMM 130-$n$ may exceed the total available storage within machine memory 110. The kernel 134 may implement a memory paging system that swaps selected pages of memory between machine memory 110 and a swap file 150 within the mass storage system 114. Any technically feasible technique may be used to page data between machine memory 110 and the swap file 150 residing within a persistent storage system. In an alternative approach, a distinct swap file may be associated with each VM 120.

Persons skilled in the art will recognize that these and other file organizations may be implemented without departing from the scope of the invention. Furthermore, any technically feasible technique may be implemented to select a page 152 to be swapped from the machine memory 110 to a swap file and vice versa as implemented with the use of a memory management table 136 that is updated accordingly.

A memory image for a typical guest OS 124 operating in concert with a typical application 128 will commonly include a large number of pages of memory written with identical data. One form of identical data is characterized by a repeating pattern of, for example, one through four bytes. For example, pages of memory written completely with zeros commonly occur. Such pages may be completely described by a simple characteristic pattern and a construction rule or "class description." Another form of identical data is characterized by complex patterns that have no discernible structure other than being instantiated multiple times as whole pages.

It should be noted, however, that the "patterns" that are identified or searched for are not limited to repeating patterns of a predetermined number of bytes nor to a complex pattern. Further, for example, in one embodiment of the present invention, a classID is used to encode the pattern and 8 bytes are used to hold in-page data. Thus, if N>8 bytes are repeating but at most 8 bytes are needed to uniquely describe the periodic part, the page will still be considered as a simple pattern. Further, it is not required that a pattern be periodic, e.g., the WORDS pattern, to be a simple pattern eligible for sharing.

In one embodiment of the present invention, a regular expression (RE) matching module 160 is provided in each VMM to identify pages with content that is a regular expression or a simple pattern. One of ordinary skill in the art will understand that the function of the RE matching module 160 may be in the VMM or in the kernel depending upon whether the implementation is in a bare-metal or hosted model of virtualization. It may also be implemented as a user-level process thus, in a bare-metal implementation, module 160 may be in the VMM or in the vmkernel and in a hosted model, in the VMM or in VMX, a user-level process in products of VMware, Inc.

Figure 2:
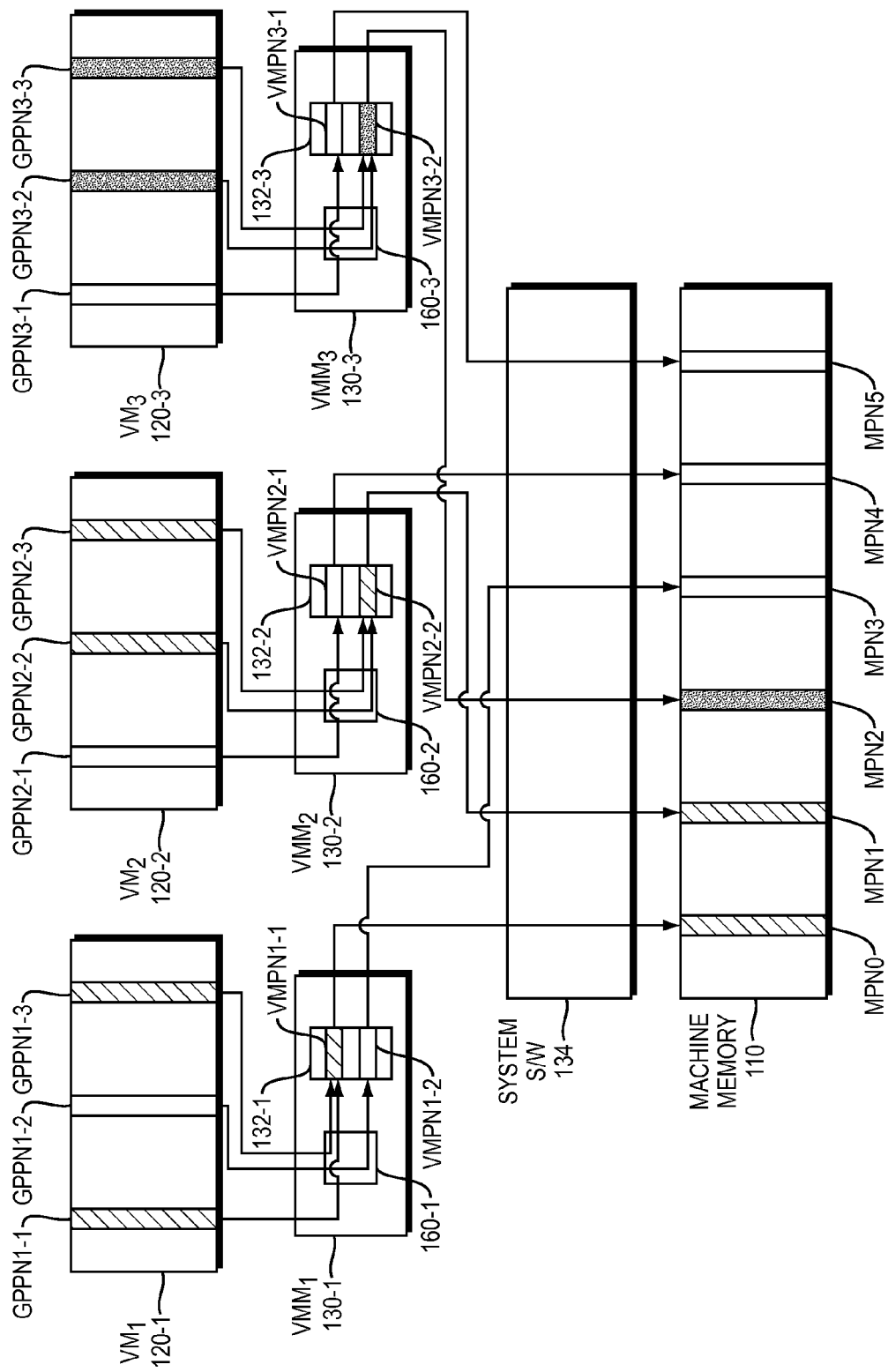
FIG. 2 illustrates a conceptual overview of an embodiment of the present invention.

An overview of the operation of one embodiment of the present invention is shown in FIG. 2. Three VMs shown as VM1 120-1, VM2 120-2 and VM3 120-3 correspond to respective VMMs, VMM1 130-1, VMM2 130-2 and VMM3 130-3. Each of the VMMs includes a respective RE matching module 160 that identifies pages with regular expressions in order to implement intra-VM page sharing.

As an illustrative example, the first VM, VM1, uses three pages, GPPN1-1, GPPN1-2 and GPPN1-3 where GPPN1-1 and GPPN1-3 have the same content represented by a first regular expression RE-A. The content of GPPN1-2 differs from that of the other two. The RE matching module 160-1 will identify that the contents of GPPN1-1 and GPPN1-3 are the same and are the same regular expression. Accordingly, each of GPPN1-1 and GPPN1-3 will be mapped to VMPN1-1 in the corresponding GPPN to MPN map 132-1. The GPPN1-2 will be mapped to VMPN1-2. It should be noted that the label "VMPN" is being used to identify particular MPNs in the GPPN to MPN map 132 and its use should not be inferred as representing an otherwise "virtualized" concept.

In accordance with a known process, the system software 134 will map VMPN1-1 to MPN0 in machine memory and map VMPN1-2 to MPN3. In this example, there is no sharing being implemented at the level of the system 134.

The second VM, VM2, uses three pages, GPPN2-1, GPPN2-2 and GPPN2-3 where GPPN2-2 and GPPN2-3 have the same content represented by the first regular expression RE-A. The content of GPPN2-1 differs from that of the other two. Thus, for illustrative purposes, the content of GPPN2-2 and GPPN2-3 is the same as that of GPPN1-1 and GPPN1-3 in VM1. The RE matching module 160-2 will identify that the content of GPPN2-2 and GPPN2-3 are the same and are the same regular expression RE-A. Accordingly, each of GPPN2-2 and GPPN2-3 will be mapped to VMPN2-2 in the corresponding GPPN to MPN map 132-2. The GPPN2-1 will be mapped to VMPN2-1. In accordance with a known process, the system software 134 will map VMPN2-1 to MPN4 in machine memory and map VMPN2-2 to MPN1. In this example, there is no sharing being implemented at the level of the system 134.

The third VM, VM3, uses three pages, GPPN3-1, GPPN3-2 and GPPN3-3 where GPPN3-2 and GPPN3-3 have the same content represented by a second regular expression RE-B different from the first regular expression RE-A in VM1 and VM2. The content of the page GPPN3-1 differs from that of the other two pages in VM3. For illustrative purposes, the content of GPPN3-1 is the same as that of GPPN1-2 and GPPN2-1 in VM1 and VM2, respectively. The RE matching module 160-3 will identify that the contents of GPPN3-2 and GPPN3-3 are the same and are the same regular expression RE-B. Accordingly, each of GPPN3-2 and GPPN3-3 will be mapped to VMPN3-2 in the corresponding GPPN to MPN map 132-3. GPPN3-1 will be mapped to VMPN3-1.

In accordance with a known process, the system software 134 will map VMPN3-1 to MPN5 in machine memory and map VMPN3-2 to MPN2. In this example, there is no sharing being implemented at the level of the system 134.

Thus, as represented in FIG. 2, within respective VMs virtual memory pages with the same regular expression content share the same machine memory page by operation of the RE matching module 160. By sharing at the VM level, issues of global locks at the system 134 level can be avoided.

As above, where regular expressions are more easily found, with respect to computation "costs" as compared to generating a hash for a memory page, sharing at the VM level provides for efficiencies where the different contents of pages are few, are easy to identify and represent the bulk of common pages.

The implementation of the RE matching module 160 includes tables and data structures that are provided to keep track of the regular expressions, those pages that match the expression and pointers to appropriate locations in memory. One of ordinary skill in the art will understand that any number of structures may be implemented.

Figure 3:
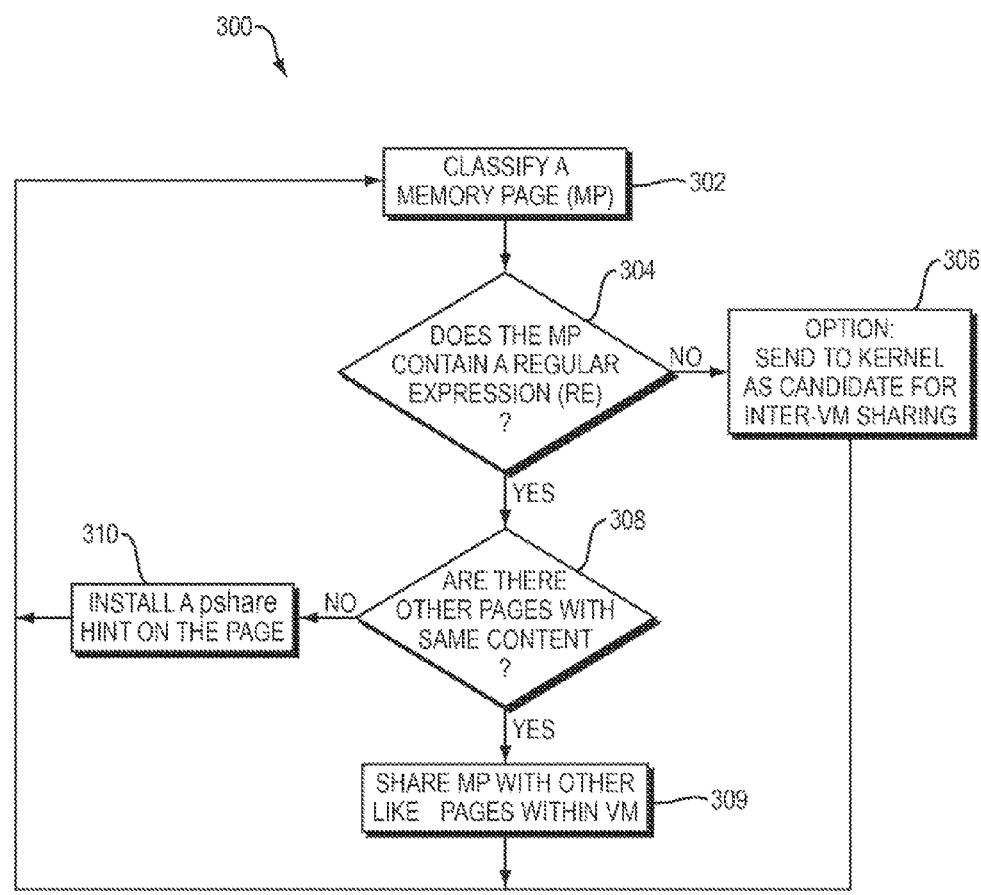
FIG. 3 is a flowchart in accordance with an embodiment of the present invention.

Referring now to FIG. 3, the RE matching module 160 implements a method 300 for identifying pages with regular expressions and implementing sharing at the VM level. The method 300 starts with a step 302 of classifying a memory page (MP) to determine its contents. A determination is performed as to whether or not the contents are of a regular expression type at step 304. If the contents are of a regular expression type then, step 308, it is determined if there are other pages with the same content. If so, step 309, the MP is shared within the VM. If not, step 310, a pshare hint is installed on the MP to indicate that it might be sharable in the VM.

Returning now to step 304, if the contents are not of the regular expression type, then control passes to step 306 where, optionally, the MP may be identified to the Kernel as a candidate for inter-VM sharing as described above.

Advantageously, testing contents of a memory page for compliance with a regular expression or pattern is often faster or simpler than calculating its hash and comparing the hash and contents and can be optimized to be more efficient.

Figure 4:
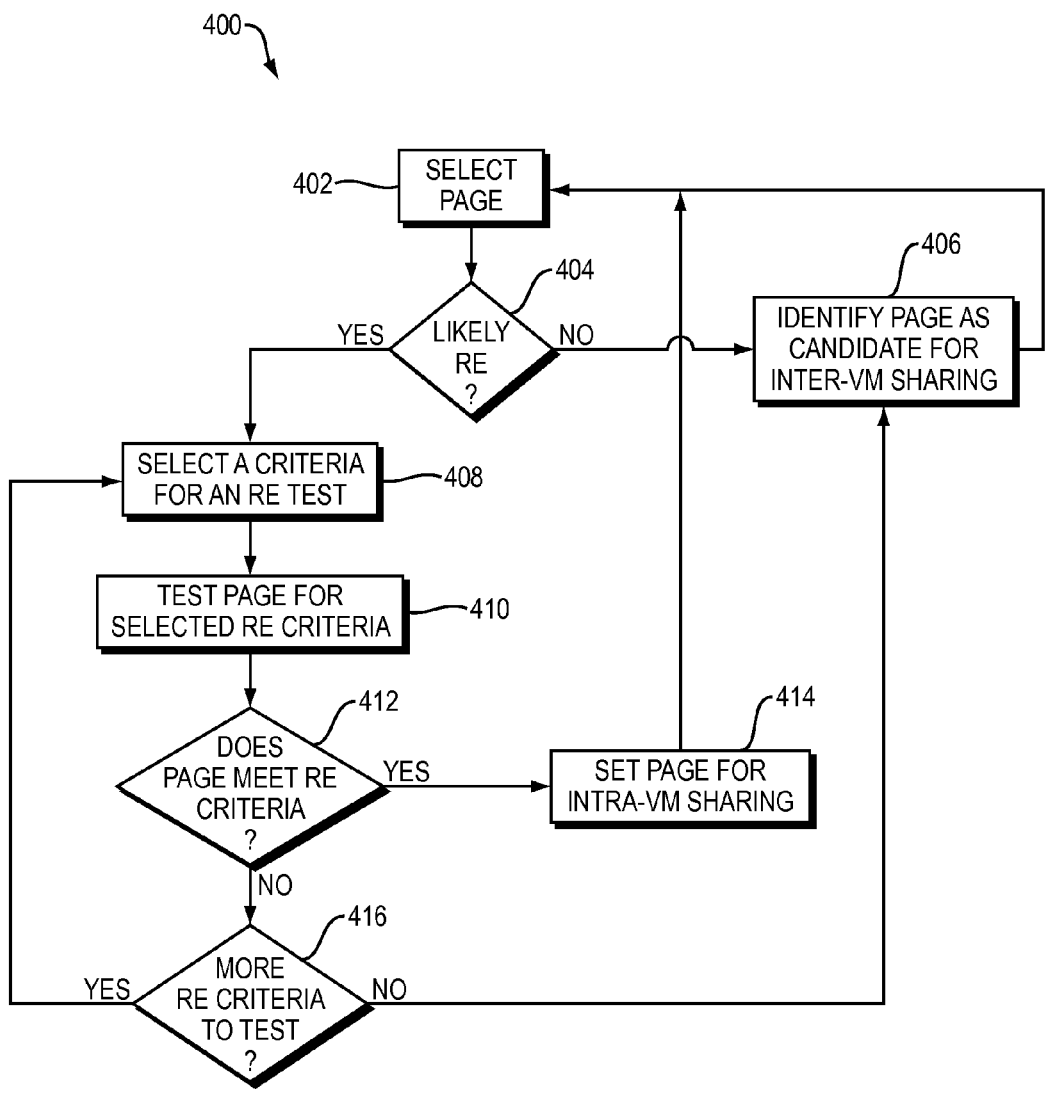
FIG. 4 is a flowchart in accordance with an embodiment of the present invention.

As shown in FIG. 4, a method 400 starts with a selection of a page, step 402, the contents of which will be analyzed for the presence of a known or expected regular expression or pattern. A "threshold" test may be applied, step 404, to determine if it is likely that the page does contain a regular expression or pattern. Such a test may be a "limited" hash on, for example, some subset of words in the page, and comparing the hash value to a list of possibles to determine whether or not it should be further analyzed for a regular expression or pattern. If it is not likely that the page contains a regular expression or pattern, then control passes to step 406 and the page may be identified for inter-VM sharing.

If it is possible that the page may contain a regular expression or pattern, then control passes to step 408 where a criteria is selected against which the contents of the selected page is compared. The criteria may consist of an expected value and a test. Thus, for example, the test may be to look at the first ten words and then test whether the fifth word is non-zero but the other words are zero. Of course, the setting of ten words is only for example and the values for criteria would have to be established to provide an acceptable level of accuracy in accordance with a system's requirements.

In one embodiment, the criteria are selected in an order that establishes an efficient approach for identifying a regular expression or pattern. The order of the criteria may be based on a decision tree or may be a "dynamic" approach based on, for example, a review of the pages that are currently being shared. Thus, for example, if the majority of pages being shared are zero pages, then the first set of criteria may be set to look for a zero page. Alternatively, instead of looking for the type of page that is being most shared, it may be more efficient to look for the regular expression or pattern that has been identified the most out of a predetermined number of the last identified patterns. This may be an indicator of a current state of the VM where the opportunities for sharing are temporal. Further, the criteria may be set based on the location of the page, i.e., based on its GPPN to look for regular expressions or patterns based on those that are "adjacent" or nearby, e.g., in a range of addresses, in the virtual memory.

As described above, one embodiment "loops" over the criteria to determine if a given MP's contents comprises data that can be characterized as a regular expression. In another embodiment of the present invention, the process is optimized such that related criteria are grouped into one or more decision trees and the system will match, or "test-against," several criteria in a single pass over a memory page's contents. In one non-limiting example, the tests for a zero page and for the WORDS page are combined.

Once the criteria is retrieved, the page is tested against the criteria in step 410. If the page matches the criteria, as determined at step 412, control passes to step 414 where the page is set for sharing or identified as sharable if another page is not already identified with that pattern or regular expression.

If the page does not match a criteria, control passes to step 416 where it is determined if there are more criteria to compare to the contents. If so, then a next criteria is selected, step 408, and the contents are re-tested. If not, then control passes to step 406 as described above.

In an alternate embodiment, the "RE/Not-RE" test at step 404 may be removed and the analysis may start at step 408.

Figure 5:
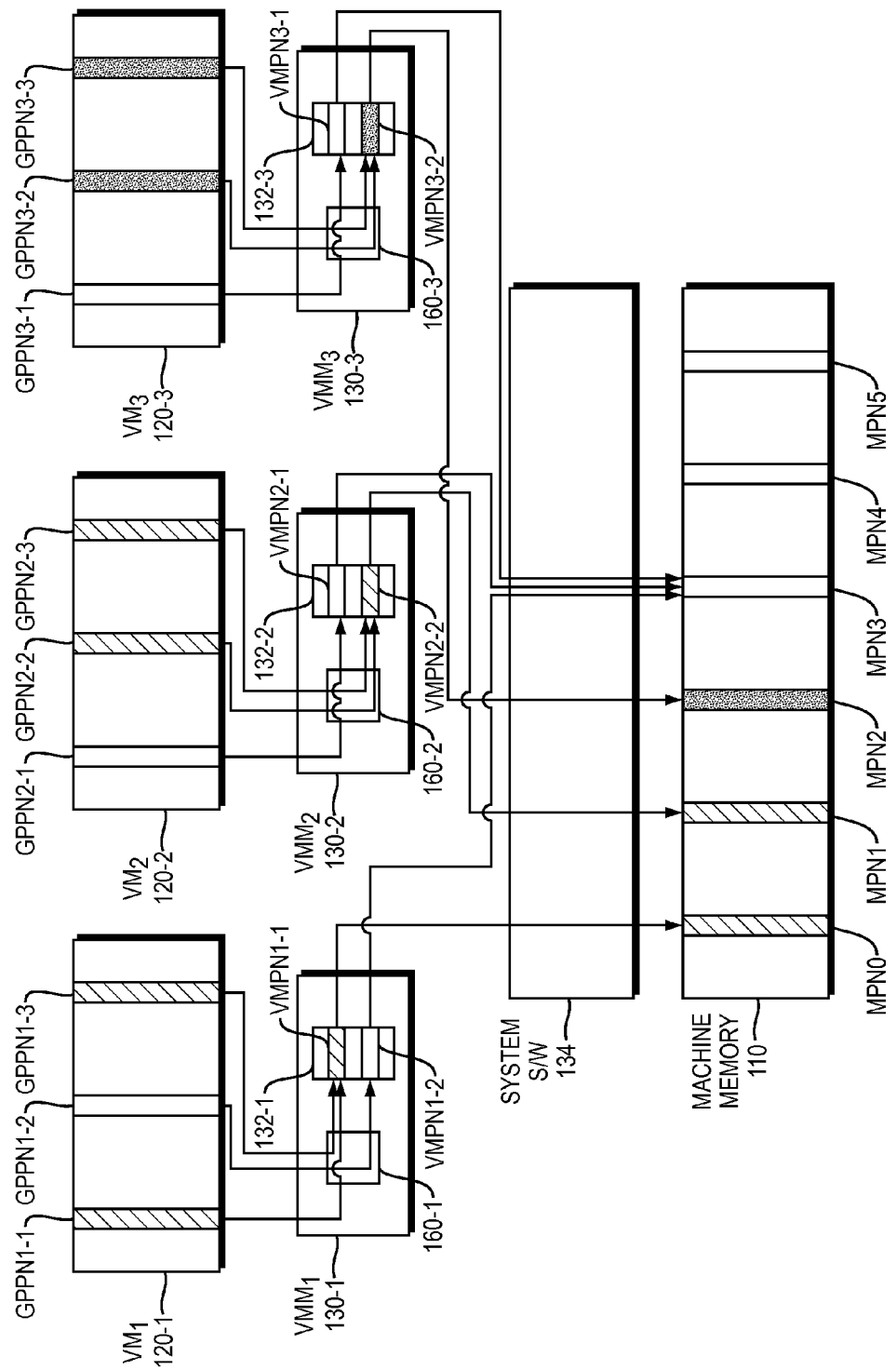
FIG. 5 illustrates a conceptual overview of another embodiment of the present invention.

Referring now to FIG. 5, a variation of the system as represented in FIG. 2 is shown. Here, the virtualization system software 134 has implemented inter-VM sharing of the memory pages VMPN1-2, VMPN2-1 and VMPN3-1 by mapping these pages to MPN3 in accordance with known memory sharing concepts as shown in, for example, U.S. Pat. No. 6,789,156 to Waldspurger, the entire contents of which is incorporated herein for all purposes. As a result, pages that have been identified as having a regular expression or pattern are shared at the VM level and those unique pages, i.e., VMPN1-2, VMPN2-1 and VMPN3-1, are shared between VMs.

Figure 6:
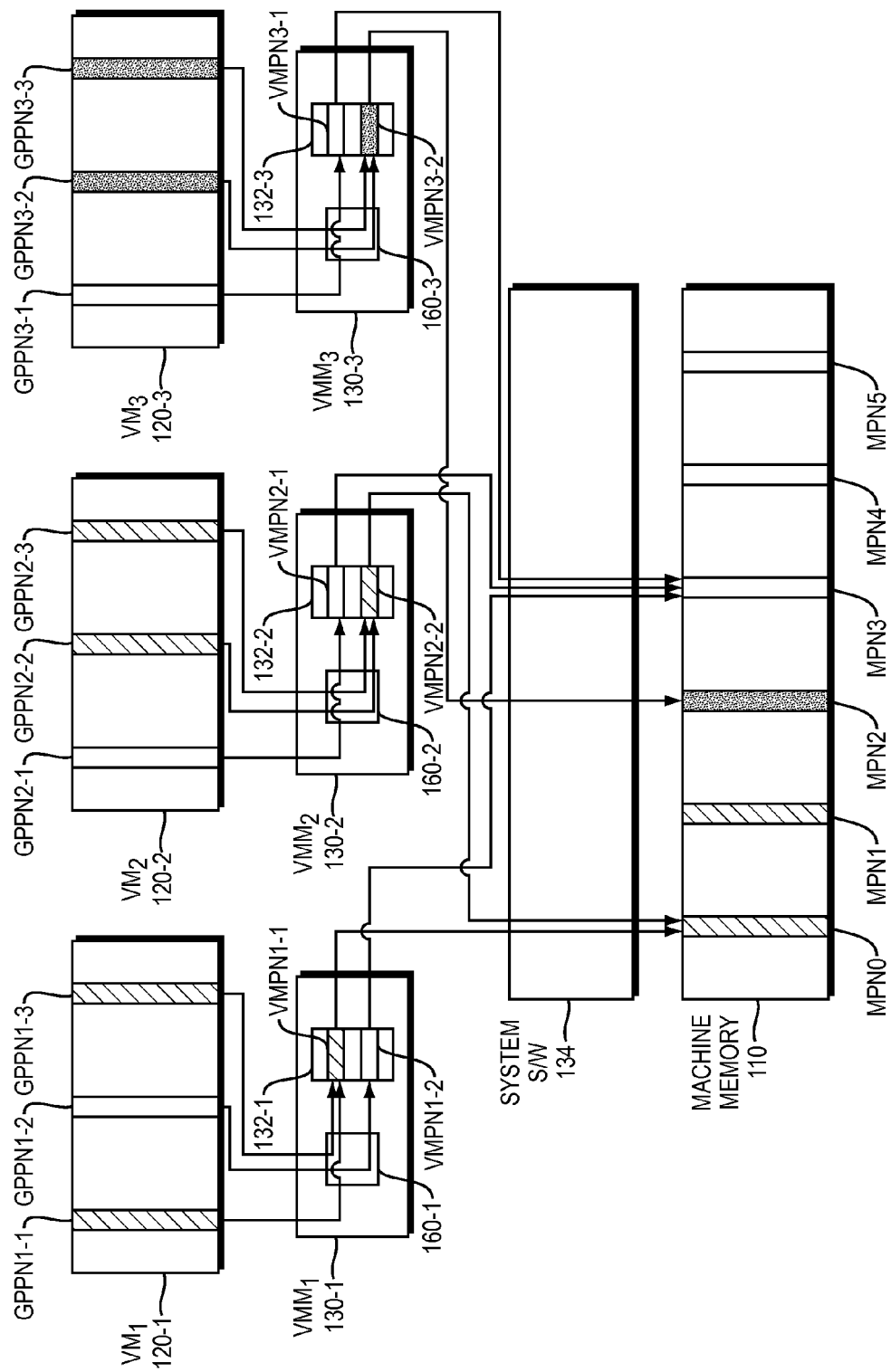
FIG. 6 illustrates a conceptual overview of yet another embodiment of the present invention.

The level of memory sharing may be further expanded, as shown in FIG. 6. Here, the virtualization system software 134 has implemented inter-VM sharing of the memory pages VMPN1-2, VMPN2-1 and VMPN3-1 by mapping these pages to MPN3 as shown in FIG. 5. In addition, in one embodiment, the virtualization system software 134 implements inter-VM sharing of the memory pages VMPN1-1 and VMPN2-1 by mapping these pages to MPN0. It should be noted, however, that the overhead of both intra-VM and inter-VM sharing, e.g., global locks, may outweigh any advantages that might be gained.

Referring back to FIG. 2, it should be noted that MPN0 and MPN3 were allocated to VM1, that MPN1 and MPN4 were allocated to VM2 and that MPN2 and MPN5 were allocated to VM3. As a result, in the embodiment shown in FIG. 5, by mapping VMPN1-2, VMPN2-1 and VMPN3-1 to MPN3, memory page sharing was being done on a memory page that was allocated to a specific virtual machine. Of course, one of ordinary skill in the art would understand that VMPN1-2, VMPN2-1 and VMPN3-1 could have been mapped to either of MPN4 or MPN5 but the same issue would be raised. Similarly, as shown in the embodiment of FIG. 6, VMPN1-1 and VMPN2-2 could have been mapped to MPN1 but this would still be sharing a memory page allocated to a specific virtual machine.

Figure 7:
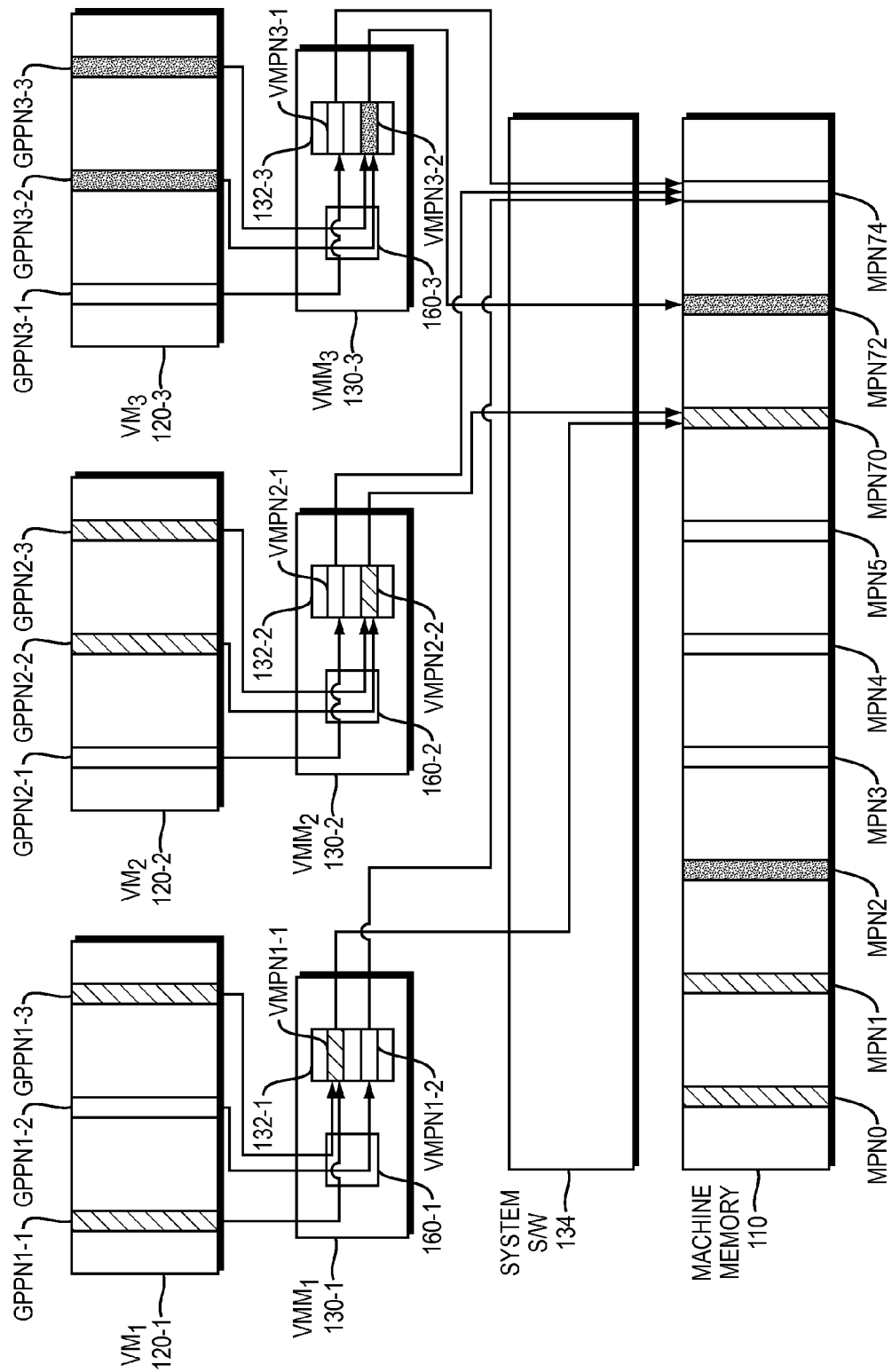
FIG. 7 illustrates a conceptual overview of still another embodiment of the present invention.

In order to avoid the additional overhead and complexities of sharing a memory page allocated to a particular virtual machine, another embodiment of the present invention is presented in FIG. 7. As shown, this embodiment is a modification of that of FIG. 6, where VMPN1-2, VMPN2-1 and VMPN3-1 are mapped to MPN74, where VMPN1-1 and VMPN2-2 are mapped to a memory page, MPN70, and where VMPN3-2 is mapped to MPN72. The memory pages MPN70, MPN72 and MPN74 are in a pool of memory pages that is separate from those dedicated to specific virtual machines and is sometime referred to as "anonymous" memory. Advantageously, better fragmentation is achieved by using these memory pages for sharing. In addition, by sharing a memory page that is not associated with a particular virtual machine, the "breaking" of the sharing is more easily accomplished and accounted for.

Additionally, a "hybrid" approach can be implemented (although not shown) based on the embodiment shown in FIG. 5. Here, VMPN1-2, VMPN2-1 and VMPN3-1 are mapped to MPN74 instead of being mapped to MPN3 as shown in FIG. 5. Thus, the inter-VM memory sharing is mapped to a machine memory page that is not associated with a specific virtual machine but the intra-VM sharing is.

Advantageously, embodiments of the present invention provide for sharing pages more efficiently and maximizes the number of shared pages at a given moment in time. More pages may be shared per time interval and more persistent pages may be identified and shared. The Quality of Service (QoS) of a system may be maintained while still implementing sharing as time and memory space overhead can be kept within desired limits As the overhead of sharing zero and patterned pages is much less than for any other type of page, embodiments of the present invention efficiently implement page sharing as it is possible to share these pages at a higher rate. Further, non-zero pages with regular expressions or patterns are better candidates for sharing as compared to zero pages.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although various exemplary embodiments of the present invention have been disclosed, it will be apparent to those skilled in the art that changes and modifications can be made which will achieve some of the advantages of the invention without departing from the general concepts of the invention. It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

We claim:

1. A method of sharing memory pages in a virtualized system comprising a first virtual machine (VM) and a corresponding first virtual machine monitor (VMM), the method comprising:

the first VMM maintaining a first mapping of a first guest physical page (GPPN) to a first machine page entry (VMPN) backed by a first machine memory page (MPN);

the first VMM maintaining a second mapping of a second guest physical page (GPPN) to a second machine page entry (VMPN) backed by a second machine memory page (MPN);

the first VMM accessing content of the first and second MPNs and determining whether or not the content of the first and second MPNs can each be represented by a first non-zero regular expression (RE); and if the content of the first and second MPNs can be represented by the first RE, then the first VMM re-mapping the first and second GPPNs to a same VMPN, wherein the first and second GPPNs are sharing the same MPN within the first VM, wherein determining if the content of the first and second MPNs represents a regular expression comprises evaluating a subset of the content of the MPN to determine whether the content might be a regular expression.

2. The method of claim 1, wherein the non-zero regular expression specifies at least one of:
a predetermined repeating pattern of data; and
a predetermined data string.

3. The method of claim 1, wherein evaluating a subset of the content comprises:
calculating a hash value on the subset; and
comparing the calculated hash value to one or more predetermined values, each representative of a regular expression.

4. The method of claim 1, wherein determining whether or not the content of the first and second MPNs can be represented by a first RE comprises:
comparing the content of the MPN to a plurality of criteria, each criteria corresponding to a respective RE.

5. The method of claim 4, further comprising:
comparing the plurality of criteria to the content of the MPN in a predetermined order.

6. The method of claim 5, further comprising:
setting the predetermined order of criteria as a function of memory pages currently being shared in the first VM.

7. The method of claim 5, further comprising:
setting the predetermined order of criteria as a function of a frequency of an occurrence of respective REs.

8. The method of claim 5, further comprising:
setting the predetermined order of criteria as a function of occurrences of respective REs in GPPNs in predetermined address ranges in virtual memory.

9. The method of claim 8, further comprising:
setting the predetermined address ranges to be within a certain distance of either of the first and second MPNs.

10. The method of claim 1, further comprising a second virtual machine (VM) and a corresponding second virtual machine monitor (VMM), the method comprising:
the second VMM maintaining a third mapping of a third guest physical page (GPPN) to a third machine page entry (VMPN) backed by a third machine memory page (MPN);
the second VMM maintaining a fourth mapping of a fourth GPPN to a fourth VMPN backed by a fourth MPN;
the second VMM accessing content of the third and fourth MPNs and determining whether or not the content of the third and fourth MPNs can each be represented by a second regular expression (RE); and if the content of the third and fourth MPN s can be represented by the second RE, then the second VMM remapping the third and fourth GPPNs to a same VMPN, wherein the third and fourth GPPNs are sharing the same MPN within the second VM.

11. The method of claim 10, further comprising:
the first VMM mapping each of the first and second GPPNs to one of the first and second VMPNs; and
the second VMM mapping each of the third and fourth GPPNs to one of the third and fourth VMPNs,
wherein the first, second, third and fourth MPN s are in the same physical memory device.

12. The method of claim 10, wherein the first and second REs are the same.

13. The method of claim 12, wherein the first, second, third and fourth MPNs are in the same physical memory device.

14. The method of claim 10, wherein determining whether or not the content of the third and fourth MPN s can be represented by the second RE comprises:
comparing the content of the MPN to a plurality of criteria in a single pass through the content of the MPN,
wherein each criteria in the plurality of criteria corresponds to a respective RE.

15. The method of claim 14, wherein the plurality of criteria are compared to the content of the MPN in a predetermined order.

16. The method of claim 10, wherein the first and second REs are the same, the method further comprising:
the first VMM mapping each of the first and second GPPNs to one of the first and second VMPNs;
the second VMM mapping each of the third and fourth GPPNs to one of the third and fourth VMPNs; and
backing each of the mapped first or second VMPN and the mapped third or fourth VMPN with a same backing MPN in a physical memory device.

17. The method of claim 16, wherein the backing MPN is different from the first, second, third and fourth MPNs.

18. The method of claim 1, wherein the first VMM remapping the first and second GPPNs to a same VMPN comprises: the first VMM mapping each of the first and second GPPNs to one of the first and second VMPNs.

19. The method of claim 1, wherein determining whether or not the content of the first and second MPNs can be represented by a first RE comprises:
comparing the content of the MPN to a plurality of criteria in a single pass through the content of the MPN, wherein each criteria in the plurality of criteria corresponds to a respective RE.

20. The method of claim 19, wherein the plurality of criteria are compared to the content of the MPN in a predetermined order.

21. A computer system including a non-transitory storage device storing computer instructions configured to perform a computer-implemented method of sharing memory pages in a virtualized system comprising a first virtual machine (VM) and a corresponding first virtual machine monitor (VMM), the method comprising:
the first VMM maintaining a first mapping of a first guest physical page (GPPN) to a first machine page entry (VMPN) backed by a first machine memory page (MPN);
the first VMM maintaining a second mapping of a second guest physical page (GPPN) to a second machine page entry (VMPN) backed by a second machine memory page (MPN);
the first VMM accessing content of the first and second MPNs and determining whether or not the content of the first and second MPNs can each be represented by a first non-zero regular expression (RE); and
if the content of the first and second MPNs can be represented by the first RE, then the first VMM re-mapping the first and second GPPNs to a same VMPN, wherein the first and second GPPNs are sharing the same MPN within the first VM,
wherein determining if the content of the first and second MPNs represents a regular expression comprises evaluating a subset of the content of the MPN to determine whether the content might be a regular expression.

22. The computer system of claim 21, wherein the non-zero regular expression specifies
at least one of: a predetermined repeating pattern of data; and a predetermined data string.

23. The computer system of claim 21, wherein evaluating a subset of the content comprises:
calculating a hash value on the subset; and
comparing the calculated hash value to one or more predetermined values, each representative of a regular expression.

24. The computer system of claim 21, wherein determining whether or not the content of the first and second MPNs can be represented by a first RE comprises:
comparing the content of the MPN to a plurality of criteria, each criteria corresponding to a respective RE.

25. The computer system of claim 24, wherein the method further comprises
comparing the plurality of criteria to the content of the MPN in a predetermined order.

26. The computer system of claim 25, wherein the method further comprises
setting the predetermined order of criteria as a function of memory pages currently being shared in the first VM.

27. The computer system of claim 25, wherein the method further comprises
setting the predetermined order of criteria as a function of a frequency of an occurrence of respective REs.

28. The computer system of claim 25, wherein the method further comprises
setting the predetermined order of criteria as a function of occurrences of respective REs in GPPNs in predetermined address ranges in virtual memory.

29. The computer system of claim 28, wherein the method further comprises
setting the predetermined address ranges to be within a certain distance of either of the first and second MPNs.

30. The computer system of claim 21, further comprising a second virtual machine (VM) and a corresponding second virtual machine monitor (VMM), wherein the method further comprises:
the second VMM maintaining a third mapping of a third guest physical page (GPPN) to a third machine page entry (VMPN) backed by a third machine memory page (MPN);
the second VMM maintaining a fourth mapping of a fourth GPPN to a fourth VMPN backed by a fourth MPN;
the second VMM accessing content of the third and fourth MPN s and determining whether or not the content of the third and fourth MPN s can each be represented by a second regular expression (RE); and
if the content of the third and fourth MPN s can be represented by the second RE, then the second VMM re-mapping the third and fourth GPPNs to a same VMPN, wherein the third and fourth GPPNs are sharing the same MPN within the second VM.

31. The computer system of claim 30, wherein the method further comprises:
- the first VMM mapping each of the first and second GPPNs to one of the first and second VMPNs; and
- the second VMM mapping each of the third and fourth GPPNs to one of the third and fourth VMPNs,
- wherein the first, second, third and fourth MPN s are in the same physical memory device.

32. The computer system of claim 30, wherein the first and second REs are the same.

33. The computer system of claim 32, wherein the first, second, third and fourth MPNs are in the same physical memory device.

34. The computer system of claim 30, wherein determining whether or not the content of the third and fourth MPN s can be represented by the second RE comprises:
- comparing the content of the MPN to a plurality of criteria in a single pass through the content of the MPN,
- wherein each criteria in the plurality of criteria corresponds to a respective RE.

35. The computer system of claim 34, wherein the plurality of criteria are compared to the content of the MPN in a predetermined order.

36. The computer system of claim 30, wherein the first and second REs are the same, the method further comprising:
- the first VMM mapping each of the first and second GPPNs to one of the first and second VMPNs; and
- the second VMM mapping each of the third and fourth GPPNs to one of the third and fourth VMPNs; and
- backing each of the mapped first or second VMPN and the mapped third or fourth VMPN with a same backing MPN in a physical memory device.

37. The computer system of claim 36, wherein the backing MPN is different from the first, second, third and fourth MPNs.

38. The computer system of claim 21, wherein the first VMM re-mapping the first and second GPPNs to a same VMPN comprises:
- the first VMM mapping each of the first and second GPPNs to one of the first and second VMPNs.

39. The computer system of claim 21, wherein determining whether or not the content of the first and second MPNs can be represented by a first RE comprises:
- comparing the content of the MPN to a plurality of criteria in a single pass through the content of the MPN,
- wherein each criteria in the plurality of criteria corresponds to a respective RE.

40. The computer system of claim 39, wherein the plurality of criteria are compared to the content of the MPN in a predetermined order.

41. A non-transitory computer readable medium comprising instructions executable in a computing device which, when executed in the computer device, cause the computing device to carry out a method of sharing memory pages in a virtualized system comprising a virtual machine (VM) and a corresponding virtual machine monitor (VMM), the method comprising:
- the VMM maintaining a first mapping of a first guest physical page (GPPN) to a first virtual machine page entry (VMPN) backed by a first machine memory page (MPN);
- the VMM maintaining a second mapping of a second guest physical page (GPPN) to a second virtual machine page entry (VMPN) backed by a second machine memory page (MPN);
- the VMM accessing content of the first and second MPNs and determining whether or not the content of the first and second MPNs can each be represented by a first non-zero regular expression (RE); and
- if the content of the first and second MPNs can be represented by the first RE, then the VMM re-mapping the first and second GPPNs to a same VMPN,
- wherein the first and second GPPNs are sharing the same MPN within the VM,
- wherein determining if the content of the first and second MPNs represents a regular expression comprises evaluating a subset of the content of the MPN to determine whether the content might be a regular expression.

* * * * *